(12) United States Patent
Zhang et al.

(10) Patent No.: US 11,256,133 B2
(45) Date of Patent: Feb. 22, 2022

(54) DIRECT-LIT BACKLIGHT SOURCE AND MANUFACTURING METHOD THEREOF, DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yu Zhang, Beijing (CN); Shixin Geng, Beijing (CN); Xiaojun Gu, Beijing (CN); Guangyun Tong, Beijing (CN); Hao Zhou, Beijing (CN); Tengfei Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 94 days.

(21) Appl. No.: 16/632,676

(22) PCT Filed: Jan. 21, 2019

(86) PCT No.: PCT/CN2019/072557
§ 371 (c)(1),
(2) Date: Jan. 21, 2020

(87) PCT Pub. No.: WO2020/150867
PCT Pub. Date: Jul. 30, 2020

(65) Prior Publication Data
US 2021/0223624 A1 Jul. 22, 2021

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133607* (2021.01); *G02F 1/133608* (2013.01); *G02F 1/133611* (2013.01)

(58) Field of Classification Search
CPC ............... G02F 1/133603; G02F 1/133611
See application file for complete search history.

(56) References Cited

U.S. PATENT DOCUMENTS 7,229,199 B2 * 6/2007 Lee ................... G02F 1/133602
362/561
7,661,835 B2 * 2/2010 Chou ................... G09G 3/3406
362/97.3

(Continued)

FOREIGN PATENT DOCUMENTS

CN 1713055 A 12/2005
CN 103104858 A 5/2013

(Continued)

*Primary Examiner* — Julie A Bannan
(74) *Attorney, Agent, or Firm* — Leason Ellis LLP

(57) ABSTRACT

A direct-lit backlight source, a manufacturing method thereof, and a display device. The direct-lit backlight source includes: a light-emitting unit array; in a first direction, the light-emitting unit array includes a third region, and a first region and a second region sequentially between a first edge and the third region; in a second direction, the light-emitting unit array includes a sixth region, and a fourth region and a fifth region sequentially between a second edge to the sixth region; light-emitting units adjacent along the first direction in the first, second, third region, have a first, second, third pitch, respectively; light-emitting units adjacent along the second direction in the fourth, fifth, sixth region, have a fourth, fifth, sixth pitch, respectively; the second pitch is greater than the first pitch and the third pitch, respectively; and the fifth pitch is greater than the fourth pitch and the sixth pitch, respectively.

19 Claims, 5 Drawing Sheets

(56) References Cited

U.S. PATENT DOCUMENTS

| | | | | |
|---|---|---|---|---|
| 2007/0189011 A1* | 8/2007 | Song | ........................ | F21V 29/71 |
| | | | | 362/294 |
| 2014/0211121 A1* | 7/2014 | Cho | .................. | G02F 1/133605 |
| | | | | 349/58 |
| 2017/0123259 A1* | 5/2017 | Kim | .................. | G02F 1/133308 |

FOREIGN PATENT DOCUMENTS

| | | |
|---|---|---|
| CN | 202915104 U | 5/2013 |
| CN | 103449072 A | 12/2013 |
| CN | 103499072 A | 1/2014 |
| KR | 1020140128798 A | 11/2014 |

* cited by examiner

DIRECT-LIT BACKLIGHT SOURCE AND MANUFACTURING METHOD THEREOF, DISPLAY DEVICE

CROSS-REFERENCE TO RELATED PATENT APPLICATIONS

This application is a U.S. National Stage Application under 35 U.S.C. § 371 of International Patent Application No. PCT/CN2019/072557, filed Jan. 21, 2019, which is incorporated by reference in its entirety.

TECHNICAL FIELD

Embodiments of the present disclosure relate to a direct-lit backlight source, a manufacturing method thereof, and a display device.

BACKGROUND

In recent years, with the flourishing development of consumer electronic devices, the market demand for display apparatuses of various dimensions is increasing. Among the display apparatuses, liquid crystal display (LCD) has occupied an important position in the field of flat panel display due to a variety of advantages such as light weight and thin thickness, low cost, high display quality, etc. LCD is a passive light-emitting apparatus and needs light emitted from a backlight source for displaying an image content. Common backlight sources include a cold cathode fluorescent lamp (CCFL) and a light emitting diode (LED), etc., in which LED has become the mainstream technology of backlight source because of advantages such as high luminous efficiency, strong color rendering ability, low driving voltage, being free from fragile parts and heavy metal material, and the like.

SUMMARY

At least one embodiment of the present disclosure provides a direct-lit backlight source, including: a light-emitting unit array, including a plurality of light-emitting units arranged in an array along a first direction and a second direction, wherein the plurality of light-emitting units are arranged in axial symmetry with a central line of the light-emitting unit array along the first direction and a central line of the light-emitting unit array along the second direction serving as symmetry axes, respectively; the light-emitting unit array includes a third region in the first direction, and further includes a first region and a second region sequentially between a first edge and the third region, and the central line along the second direction is a symmetry axis of the third region; the light-emitting unit array includes a sixth region in the second direction, and further includes a fourth region and a fifth region sequentially between a second edge and the sixth region, and the central line along the first direction is a symmetry axis of the sixth region; light-emitting units adjacent along the first direction in the first region have a first pitch, light-emitting units adjacent along the first direction in the second region have a second pitch, light-emitting units adjacent along the first direction in the third region have a third pitch, light-emitting units adjacent along the second direction in the fourth region have a fourth pitch, light-emitting units adjacent along the second direction in the fifth region have a fifth pitch, and light-emitting units adjacent along the second direction in the sixth region have a sixth pitch; the second pitch is greater than the first pitch and is greater than the third pitch, and the fifth pitch is greater than the fourth pitch and is greater than the sixth pitch.

For example, in the direct-lit backlight source provided by an embodiment of the present disclosure, the third pitch is greater than the first pitch, and the sixth pitch is greater than the fourth pitch.

For example, in the direct-lit backlight source provided by an embodiment of the present disclosure, proportions among the first pitch, the second pitch and the third pitch are equal to proportions among the fourth pitch, the fifth pitch and the sixth pitch.

For example, in the direct-lit backlight source provided by an embodiment of the present disclosure, the second pitch is equal to the fifth pitch.

For example, in the direct-lit backlight source provided by an embodiment of the present disclosure, each of the plurality of light-emitting units includes a light-emitting diode.

For example, in the direct-lit backlight source provided by an embodiment of the present disclosure, each of the plurality of light-emitting units further includes a secondary optical lens disposed on the light-emitting diode, and the secondary optical lens is configured to increase a light-emitting angle of the light-emitting unit.

For example, in the direct-lit backlight source provided by an embodiment of the present disclosure, the light-emitting angle of the light-emitting unit is in a range of 75°-85°.

For example, in the direct-lit backlight source provided by an embodiment of the present disclosure, proportions among the first pitch, the second pitch and the third pitch are 1:1.3:1.2, and proportions among the fourth pitch, the fifth pitch and the sixth pitch are 1:1.3:1.2.

For example, the direct-lit backlight source provided by an embodiment of the present disclosure further includes a film material structure disposed opposite to the light-emitting unit array, the film material structure including a diffusion plate, a brightness enhancement film and a diffusion sheet, wherein the diffusion plate is disposed at a light-exiting side of the light-emitting unit array, the brightness enhancement film is disposed at a side of the diffusion plate away from the light-emitting unit array, and the diffusion sheet is disposed at a side of the brightness enhancement film away from the diffusion plate.

For example, in the direct-lit backlight source provided by an embodiment of the present disclosure, a distance from a light-exiting surface of the light-emitting unit to the diffusion plate is in a range of 30 mm-35 mm; the second pitch is in a range of 120 mm-150 mm; and the fifth pitch is in a range of 120 mm-150 mm.

For example, in the direct-lit backlight source provided by an embodiment of the present disclosure, a distance from a light-exiting surface of the light-emitting unit to the diffusion plate is in a range of 25 mm-30 mm; the second pitch is in a range of 120 mm-130 mm; and the fifth pitch is in a range of 120 mm-130 mm.

For example, in the direct-lit backlight source provided by an embodiment of the present disclosure, a distance from a light-exiting surface of the light-emitting unit to the diffusion plate is in a range of 20 mm-25 mm; the second pitch is in a range of 90 mm-105 mm; and the fifth pitch is in a range of 90 mm-105 mm.

For example, the direct-lit backlight source provided by an embodiment of the present disclosure further includes a backplane and a reflection sheet attached onto the backplane; wherein a side of the backplane attached with the reflection sheet includes a plurality of grooves extending along the first direction, and the light-emitting unit array is disposed in the plurality of grooves; and the reflection sheet includes a plurality of notches in one-to-one correspondence with the plurality of light-emitting units, and light-emitting portions of the plurality of light-emitting units are exposed from the plurality of notches, respectively.

For example, in the direct-lit backlight source provided by an embodiment of the present disclosure, edges of the backplane are parallel with the first direction and the second direction, respectively; a distance from an edge of the backplane parallel with the second direction to the light-emitting unit array is greater than or equal to half of the first pitch, and is less than or equal to half of the second pitch; and a distance from an edge of the backplane parallel with the first direction to the light-emitting unit array is greater than or equal to half of the fourth pitch, and is less than or equal to half of the fifth pitch.

For example, in the direct-lit backlight source provided by an embodiment of the present disclosure, the light-emitting unit array further includes a seventh region in the second direction, and the seventh region is located between the fifth region and the sixth region; light-emitting units adjacent along the second direction in the seventh region have a seventh pitch, and the seventh pitch is in a floating range of ±7% around the fifth pitch.

At least one embodiment of the present disclosure further provides a display device, including the direct-lit backlight source provided by any embodiment of the present disclosure.

At least one embodiment of the present disclosure further provides a manufacturing method corresponding to the direct-lit backlight source provided by any embodiment of the present disclosure, including: obtaining a point light field distribution of each of the plurality of light-emitting units; performing a superposition to point light field distributions of the plurality of light-emitting units in the light-emitting unit array according to an objective height of optical cavity and a preset pitch, to obtain a surface light field distribution of the light-emitting unit array, and calculating an optical flux ratio of a darkest point to a brightest point in the surface light field distribution; and in a case where the optical flux ratio is less than an objective ratio, adjusting the preset pitch and performing a superposition to the point-light field distributions of the plurality of light-emitting units in an adjusted light-emitting unit array according to the objective height of optical cavity and the adjusted preset pitch, to obtain an adjusted surface light field distribution of the adjusted light-emitting unit array, and calculating an optical flux ratio of a darkest point to a brightest point in the adjusted surface-light field distribution; in a case where the optical flux ratio is greater than or equal to the objective ratio, determining the preset pitch as an objective pitch.

For example, in the manufacturing method provided by an embodiment of the present disclosure, the preset pitch includes six initial pitch values corresponding to the first pitch to the sixth pitch, respectively; and the adjusting the preset pitch includes adjusting at least one of the six initial pitch values.

For example, in the manufacturing method provided by an embodiment of the present disclosure, the objective ratio is in a range of 0.85-0.95.

For example, the manufacturing method provided by an embodiment of the present disclosure further includes: arranging the plurality of light-emitting units according to the objective pitch.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1A:
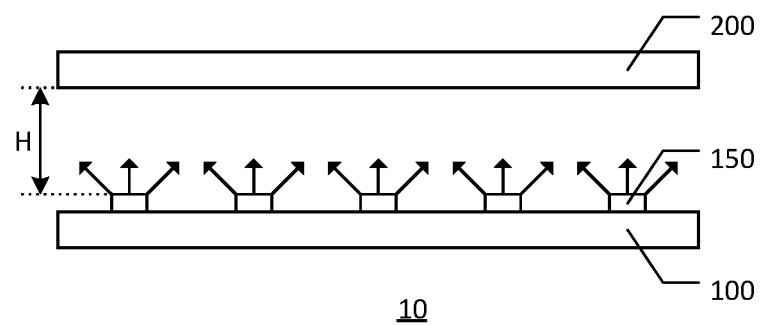
FIG. 1A is a schematic cross-sectional view of a direct-lit backlight source structure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The backlight sources can be classified into a side-lit backlight source and a direct-lit backlight source depending on a difference in incident positions of the light sources. For the side-lit backlight source, a LED light bar is arranged at one side surface of a display panel; a light guide plate converts light emitted by the linear light source at the side surface to be exited from a front side (i.e., the side where an image is displayed) of the display panel by utilizing scattering effect of light guide particles, that is, the line light source is converted into a surface light source; optical films such as a diffusion film and a brightness enhancement film, etc., further convert the surface light source into an uniform backlight source which can be used as backlight of the display panel and has a certain emitting angle. For the direct-lit backlight source, a LED array is directly disposed at a rear side of the display panel, and optical films such as the diffusion film and the brightness enhancement film, etc., are also needed to convert light emitted by the LED array into backlight source with brightness and color uniformity satisfying the demands. Generally speaking, the side-lit LED backlight source has thin thickness and mature technology, and is applicable for small- and medium-sized LED screens in, for example, mobile phones, tablet computers, digital photo frames or the like. The direct-lit LED backlight source is slightly inferior in ultra-thin performance but is not limited by the size of the screen, and is extremely applicable for super-large-sized screens in, for example, liquid crystal televisions or the like.

Figure 1B:
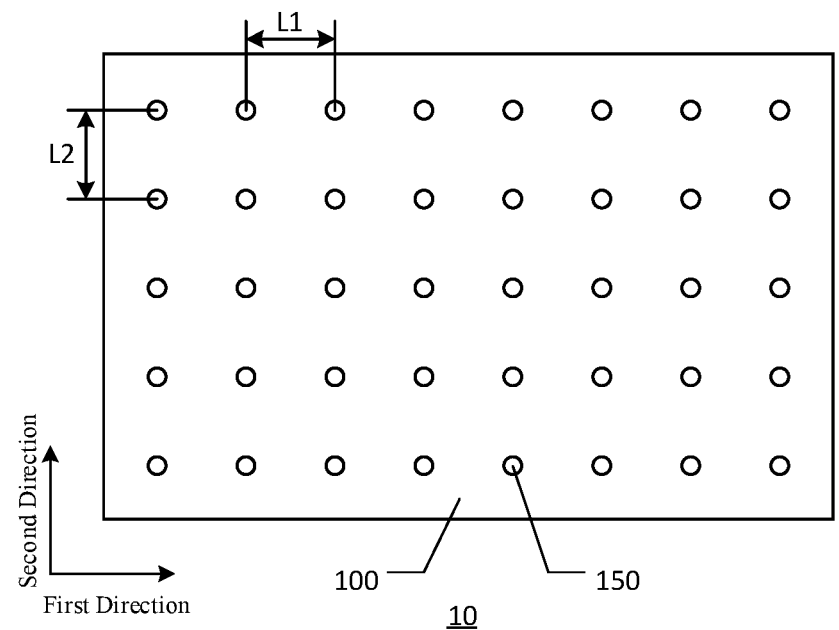
FIG. 1B is a schematic plan view of a light-emitting unit array corresponding to the direct-lit backlight source structure illustrated in FIG. 1A.

FIG. 1A is a schematic cross-sectional view of a direct-lit backlight source structure; FIG. 1B is a schematic plan view of a light-emitting unit array corresponding to the direct-lit backlight source structure illustrated in FIG. 1A.

As illustrated in FIG. 1A, the direct-lit backlight source 10 includes a backplane 100 and a film material structure 200. The backplane 100 and the film material structure 200 are disposed opposite to teach other, and a surface of the backplane 100 close to the film material structure 200 is provided with a plurality of light-emitting units 150. For example, the backplane 100 can include a circuit board, such as a printed circuit board. For example, the light-emitting unit can include a light-emitting diode (LED), and can further include a secondary optical lens disposed on the LED, and the secondary optical lens is configured to control an exited light energy and a spatial distribution property of light emitted from the LED. For example, the secondary optical lens can be configured to increase a spatial solid angle of a light field emitted by the LED, wherein the light field refers to a collection of light beams emitted by the light-emitting units 150. For example, the film material structure 200 can include a diffusion plate, a brightness enhancement film and a diffusion film.

As illustrated in FIG. 1B, in the direct-lit backlight source 10, the plurality of light-emitting units 150 are arranged in an array along a first direction and a second direction to form a light-emitting unit array. For example, the first direction and the second direction are perpendicular to each other. In the first direction, a pitch between every adjacent two light-emitting units 150 is a fixed value of L1; in the second direction, a pitch between every adjacent two light-emitting units 150 is a fixed value of L2; that is, in the direct-lit backlight source 10, the plurality of light-emitting units 150 are uniformly arranged at equal intervals. For instance, in some examples, L1 can be equal to L2.

A brightness of every region A on the film material structure 200 depends on a superposition of light fields emitted by light-emitting units 150 in one region B on the circuit board opposite to the region A and light fields emitted by light-emitting units 150 around the region B. Because the light-emitting unit 150 is a point light source and a brightness distribution of a light field emitted by the light-emitting unit 150 is attenuated rapidly with an increase of distance, the number of the light-emitting units that participate in the above-described superposition of light fields is limited. In a case where the region A is an intermediate region, the light fields received by the region A are sufficiently superposed; in a case where the region A is an edge region (excluding four corner regions), the number of the light-emitting units that contribute to the light fields received by the region A is reduced by about one half; in a case where the region A is a corner region, the number of the light-emitting units that contribute to the light fields received by the region A is further reduced. As a result, for a display screen adopting the direct-lit backlight source 10, the brightness in the edge region and the four corner regions would be obviously weaker as compared to that in the intermediate region of the display screen. Although brightness uniformity can be improved by simultaneously reducing the pitch (e.g., L1 and L2 as mentioned above) between light-emitting units and the height H of optical cavity, it's usually at the expense of increasing the power consumption of backlight and sacrificing the thickness of the liquid crystal display. It should be noted that, in the present disclosure, the height H of optical cavity refers to a distance from a light-exiting surface of the light-emitting unit 150 to the film material structure 200.

At least one embodiment of the present disclosure provides a direct-lit backlight source including a light-emitting unit array, and the light-emitting unit array includes a plurality of light-emitting units arranged in an array along a first direction and a second direction. The plurality of light-emitting units are arranged in axial symmetry with a central line of the light-emitting unit array along the first direction and a central line of the light-emitting unit array along the second direction serving as symmetry axes, respectively; the light-emitting unit array includes a third region in the first direction, and further includes a first region and a second region sequentially between a first edge and the third region, wherein the central line along the second direction is a symmetry axis of the third region; the light-emitting unit array includes a sixth region in the second direction, and further includes a fourth region and a fifth region sequentially between a second edge and the sixth region, wherein the central line along the first direction is a symmetry axis of the sixth region; light-emitting units adjacent along the first direction in the first region have a first pitch, light-emitting units adjacent along the first direction in the second region have a second pitch, light-emitting units adjacent along the first direction in the third region have a third pitch, light-emitting units adjacent along the second direction in the fourth region have a fourth pitch, light-emitting units adjacent along the second direction in the fifth region have a fifth pitch, light-emitting units adjacent along the second direction in the sixth region have a sixth pitch; the second pitch is greater than the first pitch and is greater than the third pitch; and the fifth pitch is greater than the fourth pitch and is greater than the sixth pitch.

Some embodiments of the present disclosure further provide a manufacturing method and a display device corresponding to the above-described direct-lit backlight source.

The direct-lit backlight source provided by the embodiments of the present disclosure can effectively increase the brightness and color uniformity of the display device adopting the direct-lit backlight source, and effectively mitigate the phenomena that a display edge and four display corners of the display device have poor brightness, by arranging the light-emitting units according to a "dense-sparse-dense" tendency along the first direction and the second direction, respectively.

Hereinafter, several embodiments of the present disclosure will be described in detail with reference to the accompanying drawings. It should be noted that, in order to keep the following description of the embodiments of the present disclosure clear and concise, detailed descriptions of known functions and known components may be omitted. When any one component of an embodiment of the present disclosure appears in more than one of the accompanying drawings, the component is denoted by a same or similar reference numeral in each of the drawings.

Figure 2:
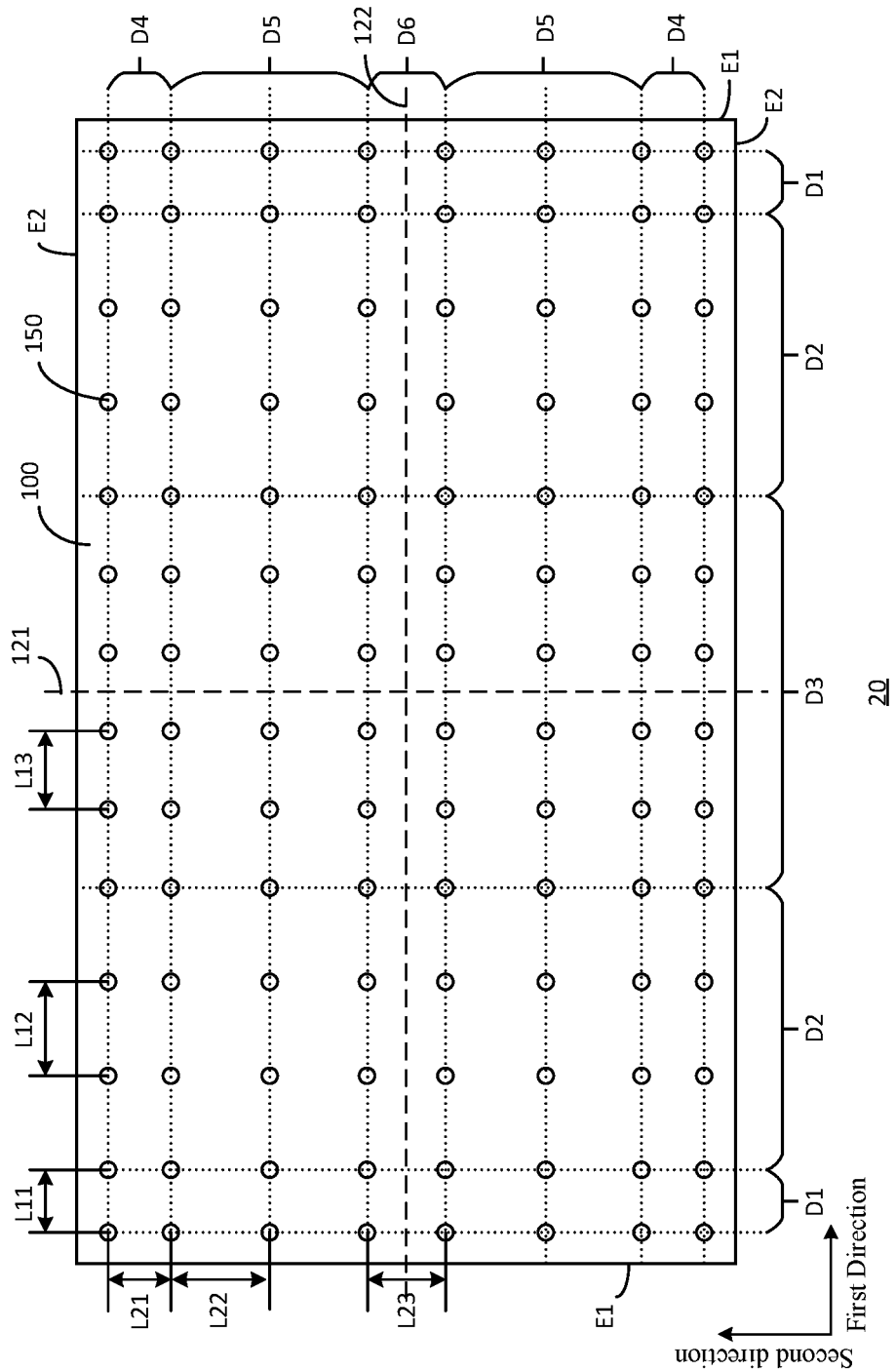
FIG. 2 is a schematic plan view of a light-emitting unit array in a direct-lit backlight source provided by some embodiments of the present disclosure.

FIG. 2 is a schematic plan view of a light-emitting unit array in a direct-lit backlight source provided by some embodiments of the present disclosure. As illustrated in FIG. 2, the direct-lit backlight source 20 includes a light-emitting unit array, and the light-emitting unit array includes a plurality of light-emitting units 150 arranged in an array along a first direction and a second direction. For example, the light-emitting unit array is disposed on a backplane 100, the same as the direct-lit backlight source illustrated in FIG. 1A. The plurality of light-emitting units 150 are arranged in axial symmetry with a central line 122 of the light-emitting unit array along the first direction and a central line 121 of the light-emitting unit array along the second direction serving as symmetry axes, respectively. The light-emitting unit array includes a third region D3 in the first direction, and further includes a first region D1 and a second region D2 sequentially between a first edge E1 and the third region D3, wherein the central line 121 along the second direction is a symmetry axis of the third region D3; the light-emitting unit array includes a sixth region D6 in the second direction, and further includes a fourth region D4 and a fifth region D5 sequentially between a second edge E2 and the sixth region D6, wherein the central line 122 along the first direction is a symmetry axis of the sixth region D6. Light-emitting units 150 adjacent along the first direction in the first region D1 have a first pitch L11, light-emitting units 150 adjacent along the first direction in the second region D2 have a second pitch L12, and light-emitting units 150 adjacent along the first direction in the third region D3 have a third pitch L13; light-emitting units 150 adjacent along the second direction in the fourth region D4 have a fourth pitch L21, light-emitting units 150 adjacent along the second direction in the fifth region D5 have a fifth pitch L22, and light-emitting units 150 adjacent along the second direction in the sixth region D6 have a sixth pitch L23; wherein the second pitch L12 is greater than the first pitch L11 and is greater than the third pitch L13; and the fifth pitch L22 is greater than the fourth pitch L21 and is greater than the sixth pitch L23. As a result, in the direct-lit backlight source 20, the light-emitting units 150 are arranged according to a "dense-sparse-dense" tendency in both the first direction and the second direction (a smaller pitch refers to a denser arrangement while a larger pitch refers to a sparser arrangement), so as to effectively increase the brightness and color uniformity of the display device adopting the direct-lit backlight source 20, and to effectively mitigate the phenomena that the display edge and four display corners of the display device have poor brightness.

It should be noted that, in the embodiments of the present disclosure, the light-emitting units located at a boundary line of any one region of the first region D1 to the sixth region D6 are regarded as being located in the region. For example, as illustrated in FIG. 2, the plurality of light-emitting units located at a boundary line of the first region D1 and the second region D2 (this boundary line is a boundary line of both of the first region D1 and the second region D2) are regarded as being located in both of the first region D1 and the second region D2. The division of belonging regions of the plurality of light-emitting units located at other boundary lines of the first region D1 to sixth region D6 can be the same as that described above, and details will not be repeated herein.

It should be noted that, in the direct-lit backlight source 20 illustrated in FIG. 2, in each of the regions (e.g., D1-D6), the times of repetition of respective pitches (L11-L13, L21-L23) are illustrative, and are not particularly limited in the present disclosure, as long as the brightness and color uniformity of the display device adopting the direct-lit backlight source 20 satisfies the demands.

For instance, in the direct-lit backlight source provided by some examples, as illustrated in FIG. 2, the third pitch L13 is greater than the first pitch L11, and the sixth pitch L23 is greater than the fourth pitch L21. Because both of the first pitch L11 and the fourth pitch L21 correspond to a pitch between light-emitting units in the edge region, the light-emitting units 150 in the edge region are arranged densely, which can effectively mitigate the phenomena that the display edge and the four display corners of the display device have poor brightness.

For instance, in the direct-lit backlight source provided by some examples, as illustrated in FIG. 2, proportions among the first pitch L11, the second pitch L12 and the third pitch L13 are equal to proportions among the fourth pitch L21, the fifth pitch L22 and the sixth pitch L23. Because the light-emitting unit 150 is a point light source and a light field emitted by the light-emitting unit 150 is spatially symmetric, the arrangements of the light-emitting unit array in the first direction and in the second direction can be similar or identical. For instance, further, in the direct-lit backlight source provided by some examples, the second pitch L12 is equal to the fifth pitch L22, so that the first pitch L11 is also equal to the fourth pitch L21, and the third pitch L13 is also equal to the sixth pitch L23. It should be noted that, in the present disclosure, the expression of "equal to" includes the case of "strictly equal to" and also includes the case of "approximately equal to" which has a difference rate within 3%.

Figure 3A:
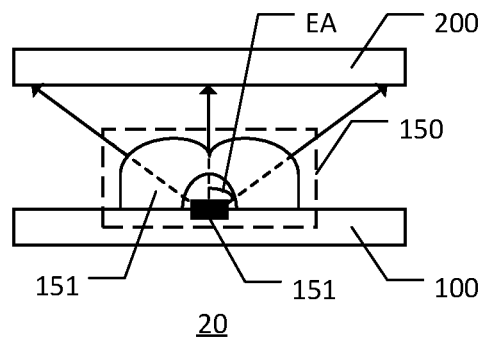
FIG. 3A is a schematic structural diagram of a light-emitting unit in a direct-lit backlight source provided by some embodiments of the present disclosure.

FIG. 3A is a schematic structural diagram of a light-emitting unit in a direct-lit backlight source provided by some embodiments of the present disclosure. For instance, in the direct-lit backlight source provided by some examples, as illustrated in FIG. 3A, the light-emitting unit 150 includes a light-emitting diode 151. For instance, in some examples, light emitted from the light-emitting diode is white light.

Figure 3B:
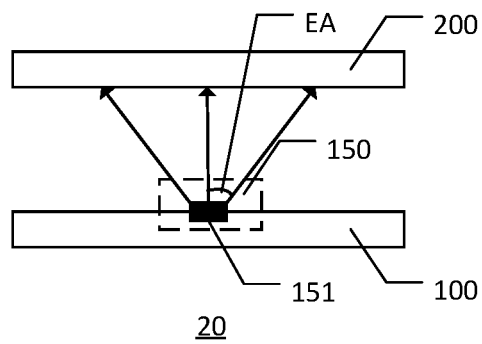
FIG. 3B is a schematic structural diagram of a light-emitting unit in another direct-lit backlight source provided by some embodiments of the present disclosure.

For instance, in the direct-lit backlight source provided by some examples, as illustrated in FIG. 3A, the light-emitting unit 150 further includes a secondary optical lens 152 disposed on the light-emitting diode 151. The secondary optical lens 152 is configured to increase a light-emitting angle EA of the light-emitting unit 150. FIG. 3B is a schematic structural diagram of a light-emitting unit in another direct-lit backlight source provided by some embodiments of the present disclosure. As compared with FIG. 3A, in FIG. 3B, the light-emitting unit 150 does not include the secondary optical lens 152. In FIG. 3A, because the secondary optical lens 152 allows light emitted from the light-emitting diode 151 to have a refraction, the light field emitted by the light-emitting unit 150 has a larger spatial solid angle; that is, the secondary optical lens 152 can increase the light-emitting angle EA of the light-emitting unit 150. It should be noted that, as illustrated in FIG. 3A and FIG. 3B, in the present disclosure, the light-emitting angle EA of the light-emitting unit 150 is half of the spatial solid angle of the light field emitted by the light-emitting unit 150. Additionally, the secondary optical lens 152 can further allow an energy distribution of the light field emitted by the light-emitting unit 150 to be more uniform, so as to improve the brightness uniformity.

It should be noted that, the secondary optical lens 152 in FIG. 3A is illustrative, and the structure and dimensions of the secondary optical lens can be referred to the manufacturing process of secondary optical lenses commonly used without particularly limited in the present disclosure, as long as it can increase the light-emitting angle of the light-emitting unit and improve the brightness uniformity.

For example, in the direct-lit backlight source illustrated in FIG. 3B, the light-emitting unit 150 only includes a light-emitting diode 151, and the light-emitting angle of the light-emitting diode 151 is not larger than, for example, 60°; that is, the light-emitting angle of the light-emitting unit 150 is not larger than 60°. For example, in the direct-lit backlight source illustrated in FIG. 3A, the light-emitting unit 150 not only includes a light-emitting diode 151 but also includes a secondary optical lens 152; and even if the light-emitting angle of the light-emitting diode 151 is not larger than, for example, 60°, the light-emitting angle of the light-emitting unit 150 can be increased to, for example, 75°-85°, under the effect of the secondary optical lens 152.

For example, in the direct-lit backlight source provided by some examples, the light-emitting angle of the light-emitting unit 150 is in a range of 75°-85°; in this case, the proportions among the first pitch L11, the second pitch L12 and the third pitch L13 are 1:1.3:1.2, and the proportions among the fourth pitch L21, the fifth pitch L22 and the sixth pitch L23 are 1:1.3:1.2.

Figure 3C:
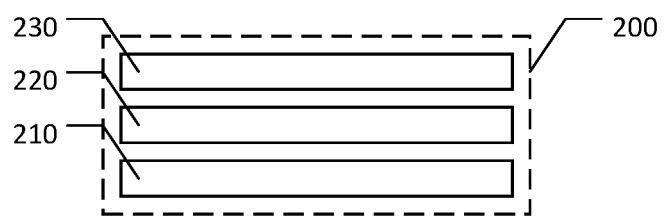
FIG. 3C is a schematic structural diagram of a film material structure in a direct-lit backlight source provided by some embodiments of the present disclosure.

For example, as illustrated in FIG. 3A and FIG. 3B, the direct-lit backlight source provided by some examples further includes a film material structure 200 disposed opposite to the light-emitting unit array. FIG. 3C is a schematic structural diagram of a film material structure in a direct-lit backlight source provided by some embodiments of the present disclosure. As illustrated in FIG. 3C, the film material structure 200 includes a diffusion plate 210, a brightness enhancement film 220 and a diffusion film 230. The diffusion plate 210 is disposed at a light-exiting side of the light-emitting unit array, the brightness enhancement film 220 is disposed at a side of the diffusion plate 210 away from the light-exiting unit array, and the diffusion film 230 is disposed at a side of the brightness enhancement film 220 away from the diffusion plate 210. For example, the diffusion plate 210, the brightness enhancement film 220 and the diffusion film 230 all can be referred to commonly used manufacturing technologies or can directly adopt mature products which can be purchased in the market, without particularly limited in the present disclosure. It should be noted that, the film material structure 200 illustrated in FIG. 3C is illustrative, and the present disclosure includes such case but is not limited thereto.

In the direct-lit backlight source provided by the embodiments of the present disclosure, a distance (i.e., the height of optical cavity) from the light-exiting surface of the light-emitting unit to the diffusion plate and the pitches of respective light-emitting units, can be adjusted simultaneously, so as to increase the brightness and color uniformity of the display device adopting the direct-lit backlight source.

For instance, in the direct-lit backlight source provided by some examples, the distance from the light-exiting surface of the light-emitting unit to the diffusion plate is in a range of 30 mm-35 mm, the second pitch L12 is in a range of 120 mm-150 mm, and the fifth pitch L22 is in a range of 120 mm-150 mm. For example, the direct-lit backlight source may provide a large-sized liquid crystal display panel with backlight; for example, a dimension of the liquid crystal display panel includes but is not limited to 46 inches, 49 inches, 55 inches and 65 inches.

For instance, in the direct-lit backlight source provided by some examples, the distance from the light-exiting surface of the light-emitting unit to the diffusion plate is in a range of 25 mm-30 mm, the second pitch L12 is in a range of 120 mm-130 mm, and the fifth pitch L22 is in a range of 120 mm-130 mm. For example, the direct-lit backlight source may provide a large-sized liquid crystal display panel with backlight; for example, a dimension of the liquid crystal display panel includes but is not limited to 46 inches, 49 inches, 55 inches and 65 inches.

For instance, in the direct-lit backlight source provided by some examples, the distance from the light-exiting surface of the light-emitting unit to the diffusion plate is in a range of 20 mm-25 mm, the second pitch L12 is in a range of 90 mm-105 mm, and the fifth pitch L22 is in a range of 90 mm-105 mm. For example, the direct-lit backlight source may provide a large-sized liquid crystal display panel with backlight; for example, a dimension of the liquid crystal display panel includes but is not limited to 46 inches, 49 inches, 55 inches and 65 inches.

It should be noted that, after the second pitch L12 is determined, the first pitch L11 and the third pitch L13 can be obtained according to the proportions (e.g., 1:1.3:1.2) among the first pitch L11, the second pitch L12 and the third pitch L13; similarly, after the fifth pitch L22 is determined, the fourth pitch L21 and the sixth pitch L23 can be obtained according to the proportions (e.g., 1:1.3:1.2) among the fourth pitch L21, the fifth pitch L22 and the sixth pitch L23.

Figure 4:
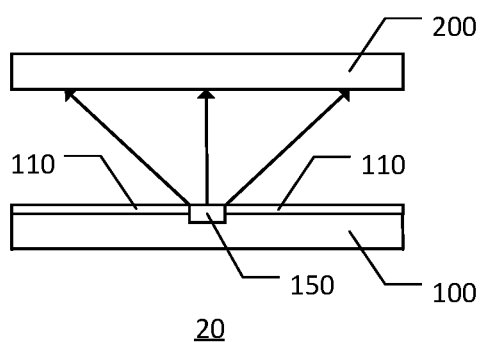
FIG. 4 is a schematic structural diagram of a direct-lit backlight source provided by some embodiments of the present disclosure.

FIG. 4 is a schematic structural diagram of a direct-lit backlight source provided by some embodiments of the present disclosure. For instance, as illustrated in FIG. 4, the direct-lit backlight source provided by some examples further includes a backplane 100 and a reflection sheet 110 attached onto the backplane 100. A side of the backplane 100 attached with the reflection sheet 110 includes a plurality of grooves extending along the first direction, and the light-emitting unit array is disposed in the plurality of grooves; that is, each of the light-emitting units 150 is disposed in one of the grooves. The reflection sheet 110 includes a plurality of notches, the plurality of notches are in one-to-one correspondence with the plurality of light-emitting units 150, and light-emitting portions (i.e., cones of the light fields being emitted) of the plurality of light-emitting units 150 are exposed from the plurality of notches, respectively; that is, the reflection sheet 110 would not block the light emitted from the light-emitting units 150. It should be noted that, the arrangement manner of the reflection sheet 110 and the light-emitting units 150 on the backplane 100 is illustrated in FIG. 4 by way of example, and the present disclosure includes such case but is not limited thereto. For instance, in some other examples, the light-emitting units are disposed on a plurality of light bars extending in the first direction; the plurality of light bars are disposed on the backplane, for example, the backplane includes a plurality of grooves extending in the first direction, and each of the grooves is provided with one of the light bars; the reflection sheet covers the backplane, and the reflection sheet includes a plurality of notches to expose the plurality of light bars so as not to block the light emitted by the light-emitting units.

For instance, in the direct-lit backlight source provided by some examples, as illustrated in FIG. 2, edges of the backplane 100 are parallel to the first direction and the second direction, respectively. For example, a first edge E1 of the backplane 100 is parallel to the second direction, and a second edge E2 is parallel to the first direction. A distance from an edge (i.e., the first edge E1) of the backplane 100 parallel with the second direction to the light-emitting unit array is greater than or equal to half of the first pitch L11, and is less than or equal to half of the second pitch L12; a distance from an edge (i.e., the second edge E2) of the backplane 100 parallel with the first direction to the light-emitting unit array is greater than or equal to half of the fourth pitch L21, and is less than or equal to half of the fifth pitch L22. In this way, it can effectively mitigate the phenomena that the display edge and four display corners of the display device have poor brightness. It should be noted that, the distance from the first edge E1 to the light-emitting unit array refers to a distance from the first edge E1 to a light-emitting unit which is nearest to the first edge E1, and the distance from the second edge E2 to the light-emitting unit array refers to a distance from the second edge E2 to the light-emitting unit which is nearest to the first edge E1.

It should be noted that, in some examples, by reasonably selecting a value of the distance from the light-exiting surface of the light-emitting unit to the diffusion plate, a value of the second pitch L12, and a value for the fifth pitch L22, respectively, then determining values of the first pitch L11, the third pitch L13, the fourth pitch L21 and the sixth pitch L23 according to the proportions among the first pitch L11, the second pitch L12 and the third pitch L13, and the proportions among the fourth pitch L21, the fifth pitch L22 and the sixth pitch L23, and finally reasonably determining the times of repetition of each of the pitches, it allows that the distance from the first edge E1 of the backplane 100 to the light-emitting unit array is greater than or equal to half of the first pitch L11 and is less than or equal to half of the second pitch L12, and allows that the distance from the second edge E2 of the backplane 100 to the light-emitting unit array is greater than or equal to half of the fourth pitch L21 and is less than or equal to half of the fifth pitch L22, thereby satisfying the requirements on brightness uniformity. However, in some other examples, due to the limitation of the dimension (corresponding to the dimension of the display region of the display device) of the backplane 100, the distance from the edge E1 and/or edge E2 of the backplane 100 to the light-emitting unit array may not satisfy the above-described requirements by the above-described process; in such cases, a region can be additionally provided in the first direction and/or the second direction correspondingly, the pitch of adjacent light-emitting units in this region is not equal to the pitch of adjacent light-emitting units in any other region along the same direction, so that the distance from the edge E1 and/or edge E2 of the backplane 100 to the light-emitting unit array can satisfy the above-described requirements.

Figures 5, 6:
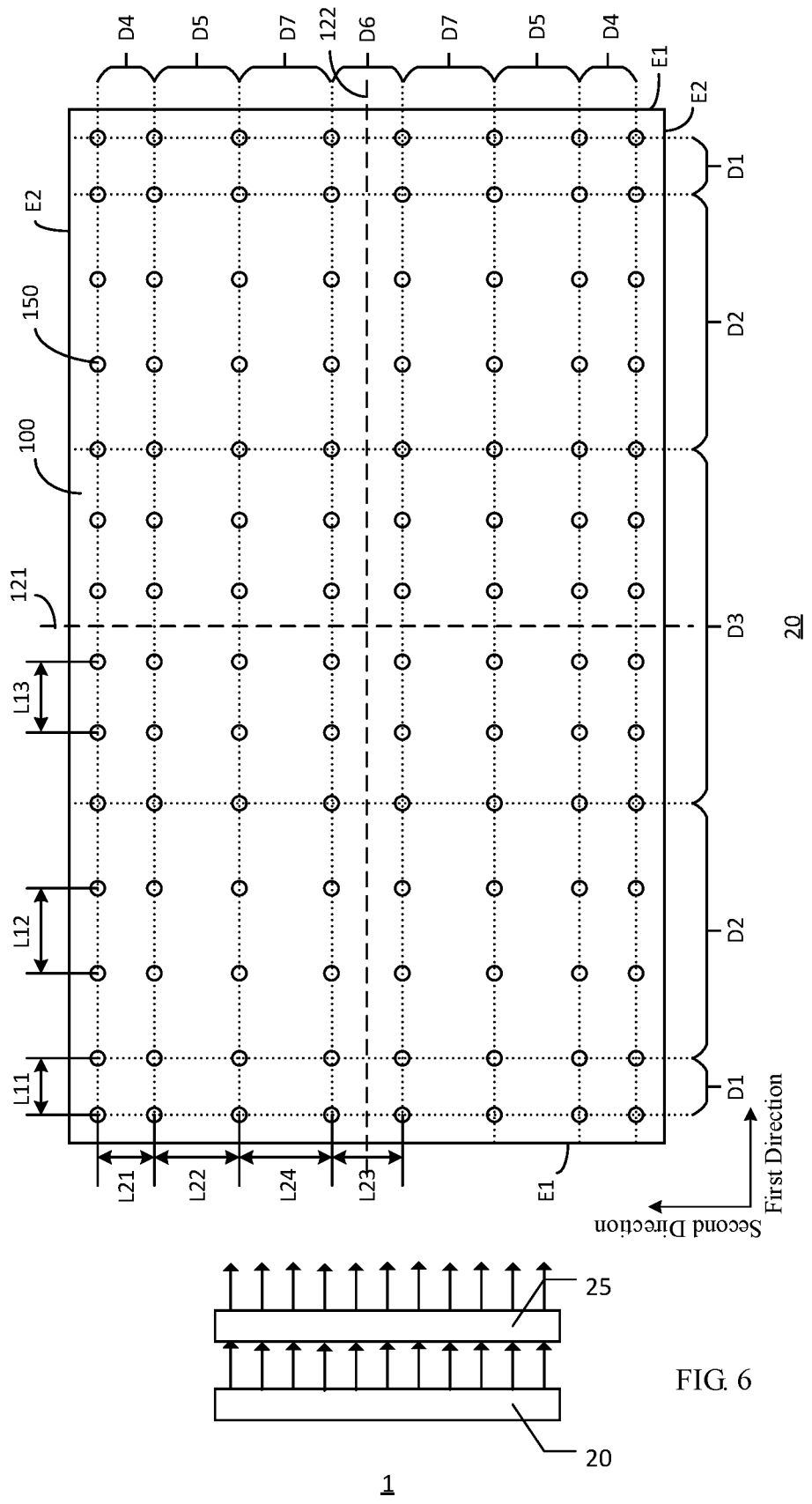
FIG. 5 is a schematic plan view of a light-emitting unit array in another direct-lit backlight source provided by some embodiments of the present disclosure.
FIG. 6 is a schematic structural diagram of a display device provided by some embodiments of the present disclosure.

FIG. 5 is a schematic plan view of a light-emitting unit array in another direct-lit backlight source provided by some embodiments of the present disclosure. The light-emitting unit array of the direct-lit backlight source illustrated in FIG. 5 is different from the light-emitting unit array of the direct-lit backlight source illustrated in FIG. 2 in that: in the direct-lit backlight source 20 illustrated in FIG. 5, the light-emitting unit array further includes a seventh region D7 in the second direction. For example, the seventh region D7 may be located between the fifth region D5 and the sixth region D6, without particularly limited in the present disclosure. In the seventh region D7, light-emitting units adjacent along the second direction have a seventh pitch L24. For example, the seventh pitch L24 can be in a floating range of ±7% around the fifth pitch L22, so that the light-emitting units 150 are still arranged according to the "dense-sparse-dense" tendency in the second direction. It should be noted that, the specific value for the floating range is not particularly limited in the embodiments of the present disclosure, as long as it satisfies the requirements on brightness uniformity. It should be noted that, other configurations of the light-emitting unit array of the direct-lit backlight source illustrated in FIG. 5 are substantially the same as those of the light-emitting unit array of the direct-lit backlight source illustrated in FIG. 2; the similar parts may be referred to the above description of the direct-lit backlight source illustrated in FIG. 2 and details will not be repeated herein.

It should be noted that, those skilled in the art shall obtain inspirations from the direct-lit backlight source illustrated in FIG. 5. For instance, in the direct-lit backlight source provided by some examples, the light-emitting unit array can further include an eighth region in the first direction, the eighth region is located between the second region and the third region, light-emitting units adjacent along the first direction in the eighth region have an eighth pitch, and the eighth pitch is in a floating range of ±7% around the second pitch, so that the light-emitting units are still arranged according to the "dense-sparse-dense" tendency in the first direction.

It should be noted that, the brightness and color uniformity of the backlight provided by the light-emitting unit array of the direct-lit backlight source according to the embodiments of the present disclosure can be verified by theoretical calculations in combination with experiments. For example, the method and process of verification can be referred to the following manufacturing method of the direct-lit backlight source provided by the present disclosure. For example, a point light field distribution of the light-emitting unit can be obtained by experimental measurement, and then a surface light field distribution of the light-emitting unit array can be calculated based on respective parameters of pitches of the light-emitting unit array in the foregoing embodiments, and further, an optical flux ratio of a darkest point to a brightest point in the surface light field distribution can be calculated. For example, the optical flux ratio of the darkest point to the brightest point in the surface light field distribution of the direct-lit backlight source provided by the embodiment of the present disclosure can be, for example, above 0.85, for example, above 0.9, and for example, above 0.95.

At least one embodiment of the present disclosure further provides a display device, which includes the direct-lit backlight source provided by the foregoing embodiments of the present disclosure. FIG. 6 is a schematic structural diagram of a display device provided by some embodiments of the present disclosure. For example, as illustrated in FIG. 6, the display device 1 includes the above-described direct-lit backlight source 20. For example, as illustrated in FIG. 6, the display device 1 can further include a display panel 25; for example, the display panel 25 can be a liquid crystal display panel. For example, as illustrated in FIG. 6, a non-display side of the liquid crystal display panel 25 is opposite to the light-exiting side of the direct-lit backlight source 20, so that the direct-lit backlight source 20 can provide the liquid crystal display panel 25 with backlight.

It should be noted that, the display device 1 in the present embodiment can be any product or component having a display function, such as a display, a liquid crystal television and the like, without particularly limited in the embodiment of the present disclosure. The technical effect(s) of the display device provided by the embodiment of the present disclosure can be referred to the corresponding description (s) related to the direct-lit backlight source in the foregoing embodiments, and details will not be repeated herein.

It should be noted that, for the purpose of clarity and concision, a complete structure of the display device 1 is not provided. In order to achieve necessary function(s) of the display device, those skilled in the art can set other structures that are not illustrated according to particular application scenarios, without particularly limited in the embodiments of the present disclosure.

Figure 7:
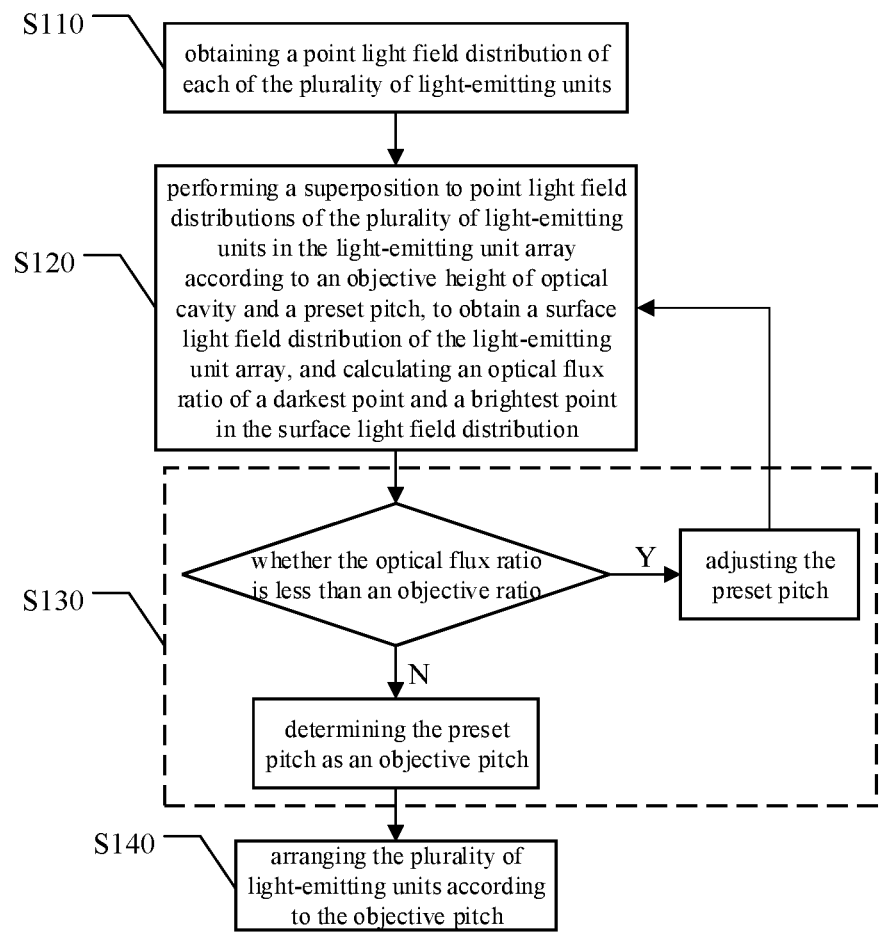
FIG. 7 is a schematic flowchart of a manufacturing method of a direct-lit backlight source provided by some embodiments of the present disclosure.

At least one embodiment of the present disclosure further provides a manufacturing method corresponding to the direct-lit backlight source provided by the foregoing embodiments. FIG. 7 is a schematic flowchart of a manufacturing method of a direct-lit backlight source provided by some embodiments of the present disclosure. As illustrated in FIG. 7, the manufacturing method can include the following steps.

Step S110, obtaining a point light field distribution of each of the plurality of light-emitting units;

Step S120, performing a superposition to point light field distributions of the plurality of light-emitting units in the light-emitting unit array according to an objective height of optical cavity and a preset pitch, to obtain a surface light field distribution of the light-emitting unit array, and calculating an optical flux ratio of a darkest point and a brightest point in the surface light field distribution; and Step S130, in a case where the optical flux ratio is less than an objective ratio, adjusting the preset pitch and performing a superposition to the point light field distributions of the plurality of light-emitting units in an adjusted light-emitting unit array according to the objective height of optical cavity and the adjusted preset pitch, to obtain an adjusted surface light field distribution of the adjusted light-emitting unit array, and calculating an optical flux ratio of a darkest point to a brightest point in the adjusted surface light field distribution; and in a case where the optical flux ratio is greater than or equal to the objective ratio, determining the preset pitch as an objective pitch.

For example, in step S110, the point light field distribution of the light-emitting unit can be obtained via experimental measurement or theoretic calculation. For instance, in some examples, the light-emitting unit includes a light-emitting diode and a secondary optical lens, and a light-emitting angle of the light-emitting unit can be calculated on the basis of a light-emitting angle of the light-emitting diode, in combination with a refractive index and a surface structure of the secondary optical lens, and according to the Fresnel's law. For instance, in some examples, the point light field distribution of the light-emitting unit can be measured by changing a position of a detecting region of a photoelectric detector with respect to the light-emitting unit during the experimental measurement.

For instance, in the manufacturing method provided by some examples, the preset pitch in the step S120 includes six initial pitch values corresponding to the first pitch to the sixth pitch, respectively. For example, the six initial pitch values can be set as a same value, or can be set according to a certain proportion based on experiences; for example, the six initial pitch values can be set according to a case where the proportions among the first pitch, the second pitch and the third pitch are 1:1.3:1.2, and the proportions among the fourth pitch, the fifth pitch and the sixth pitch are also 1:1.3:1.2. For instance, in the manufacturing method provided by some examples, adjusting the preset pitch in step S130 includes adjusting at least one of the six initial pitch values.

It should be noted that, each pitch value included in the preset pitch is variable, and is iteratively adjusted during a procedure of the manufacturing method until the brightness uniformity of the direct-lit backlight source satisfies a preset requirement (i.e., the optical flux ratio of the darkest point and the brightest point is greater than or equal to the object ratio).

For instance, in the manufacturing method provided by some examples, the objective ratio can be set as 0.85-0.95. It should be noted that, the greater the value of the objective ratio is set, the more times the preset pitch needed to be iteratively adjusted in principle, the more time the procedure costs, and the higher the brightness uniformity of the direct-lit backlight source finally obtained will be.

For instance, as illustrated in FIG. 7, the manufacturing method provided by some example further includes step S140: arranging the plurality of light-emitting units according to the objective pitch. For example, in step S140, the plurality of light-emitting units can be arranged on a backplane. For instance, the manufacturing method provided by some examples further includes: manufacturing a complete direct-lit backlight source based on the backplane obtained in step S140, for example, by arranging a reflection sheet and a film material structure, etc.

The technical effect(s) of the manufacturing method of the direct-lit backlight source provided by the embodiment of the present disclosure can be referred to the corresponding description(s) related to the direct-lit backlight source 20 in the foregoing embodiments, and details will not be repeated herein.

It should be noted that, for the purpose of clarity and concision, not all process flows of the manufacturing method of the direct-lit backlight source are provided. In order to achieve necessary function(s) of the direct-lit backlight source, those skilled in the art may add other step(s) (e.g., arranging the reflection sheet, the diffusion plate or the like) based on the steps of the manufacturing method provided by the embodiment of the present disclosure, without particularly limited in the embodiments of the present disclosure.

For the disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a region may be enlarged or narrowed, that is, the drawings are not drawn in a real scale.

(3) In case of no conflict, the embodiments of the present disclosure and the features in the embodiments can be combined with each other to obtain new embodiments.

What have been described above are only specific implementations of the present disclosure, the protection scope of the present disclosure is not limited thereto. The protection scope of the present disclosure should be based on the protection scope of the claims.

What is claimed is:

1. A direct-lit backlight source, comprising:
   a light-emitting unit array, comprising a plurality of light-emitting units arranged in an array along a first direction and a second direction, wherein the plurality of light-emitting units are arranged in axial symmetry with a central line of the light-emitting unit array along the first direction and a central line of the light-emitting unit array along the second direction serving as symmetry axes, respectively;

the light-emitting unit array comprises a third region in the first direction, and further comprises a first region and a second region sequentially between a first edge and the third region, and the central line along the second direction is a symmetry axis of the third region;

the light-emitting unit array comprises a sixth region in the second direction, and further comprises a fourth region and a fifth region sequentially between a second edge and the sixth region, and the central line along the first direction is a symmetry axis of the sixth region;

light-emitting units adjacent along the first direction in the first region have a first pitch, light-emitting units adjacent along the first direction in the second region have a second pitch, light-emitting units adjacent along the first direction in the third region have a third pitch, light-emitting units adjacent along the second direction in the fourth region have a fourth pitch, light-emitting units adjacent along the second direction in the fifth region have a fifth pitch, and light-emitting units adjacent along the second direction in the sixth region have a sixth pitch;

the second pitch is greater than the first pitch and is greater than the third pitch, and the fifth pitch is greater than the fourth pitch and is greater than the sixth pitch;

the third pitch is greater than the first pitch, and the sixth pitch is greater than the fourth pitch.

2. The direct-lit backlight source according to claim 1, wherein proportions among the first pitch, the second pitch and the third pitch are equal to proportions among the fourth pitch, the fifth pitch and the sixth pitch.

3. The direct-lit backlight source according to claim 2, wherein the second pitch is equal to the fifth pitch.

4. The direct-lit backlight source according to claim 1, wherein each of the plurality of light-emitting units comprises a light-emitting diode.

5. The direct-lit backlight source according to claim 4, wherein each of the plurality of light-emitting units further comprises a secondary optical lens disposed on the light-emitting diode, and the secondary optical lens is configured to increase a light-emitting angle of the light-emitting unit.

6. The direct-lit backlight source according to claim 5, wherein the light-emitting angle of the light-emitting unit is in a range of 75°-85°.

7. The direct-lit backlight source according to claim 6, wherein proportions among the first pitch, the second pitch and the third pitch are 1:1.3:1.2, and proportions among the fourth pitch, the fifth pitch and the sixth pitch are 1:1.3:1.2.

8. The direct-lit backlight source according to claim 5, further comprising a film material structure disposed opposite to the light-emitting unit array, the film material structure comprising a diffusion plate, a brightness enhancement film and a diffusion sheet, wherein the diffusion plate is disposed at a light-exiting side of the light-emitting unit array, the brightness enhancement film is disposed at a side of the diffusion plate away from the light-emitting unit array, and the diffusion sheet is disposed at a side of the brightness enhancement film away from the diffusion plate.

9. The direct-lit backlight source according to claim 8, wherein a distance from a light-exiting surface of the light-emitting unit to the diffusion plate is in a range of 30 mm-35 mm; the second pitch is in a range of 120 mm-150 mm; and the fifth pitch is in a range of 120 mm-150 mm.

10. The direct-lit backlight source according to claim 8, wherein a distance from a light-exiting surface of the light-emitting unit to the diffusion plate is in a range of 25 mm-30 mm; the second pitch is in a range of 120 mm-130 mm; and the fifth pitch is in a range of 120 mm-130 mm.

11. The direct-lit backlight source according to claim 8, wherein a distance from a light-exiting surface of the light-emitting unit to the diffusion plate is in a range of 20 mm-25 mm; the second pitch is in a range of 90 mm-105 mm; and the fifth pitch is in a range of 90 mm-105 mm.

12. The direct-lit backlight source according to claim 1, further comprising a backplane and a reflection sheet attached onto the backplane; wherein a side of the backplane attached with the reflection sheet comprises a plurality of grooves extending along the first direction, and the light-emitting unit array is disposed in the plurality of grooves; and the reflection sheet comprises a plurality of notches in one-to-one correspondence with the plurality of light-emitting units, and light-emitting portions of the plurality of light-emitting units are exposed from the plurality of notches, respectively.

13. The direct-lit backlight source according to claim 12, wherein edges of the backplane are parallel with the first direction and the second direction, respectively;

a distance from an edge of the backplane parallel with the second direction to the light-emitting unit array is greater than or equal to half of the first pitch, and is less than or equal to half of the second pitch; and a distance from an edge of the backplane parallel with the first direction to the light-emitting unit array is greater than or equal to half of the fourth pitch, and is less than or equal to half of the fifth pitch.

14. The direct-lit backlight source according to claim 1, wherein the light-emitting unit array further comprises a seventh region in the second direction, and the seventh region is located between the fifth region and the sixth region;

light-emitting units adjacent along the second direction in the seventh region have a seventh pitch, and the seventh pitch is in a floating range of ±7% around the fifth pitch.

15. A display device, comprising the direct-lit backlight source according to claim 1.

16. A manufacturing method of a direct-lit backlight source, wherein the direct-lit backlight source comprises:

a light-emitting unit array, comprising a plurality of light-emitting units arranged in an array along a first direction and a second direction, wherein the plurality of light-emitting units are arranged in axial symmetry with a central line of the light-emitting unit array along the first direction and a central line of the light-emitting unit array along the second direction serving as symmetry axes, respectively;

the light-emitting unit array comprises a third region in the first direction, and further comprises a first region and a second region sequentially between a first edge and the third region, and the central line along the second direction is a symmetry axis of the third region;

the light-emitting unit array comprises a sixth region in the second direction, and further comprises a fourth region and a fifth region sequentially between a second edge and the sixth region, and the central line along the first direction is a symmetry axis of the sixth region;

light-emitting units adjacent along the first direction in the first region have a first pitch, light-emitting units adjacent along the first direction in the second region have a second pitch, light-emitting units adjacent along the first direction in the third region have a third pitch, light-emitting units adjacent along the second direction in the fourth region have a fourth pitch, light-emitting units adjacent along the second direction in the fifth region have a fifth pitch, and light-emitting units adjacent along the second direction in the sixth region have a sixth pitch;

the second pitch is greater than the first pitch and is greater than the third pitch, and the fifth pitch is greater than the fourth pitch and is greater than the sixth pitch;

wherein the manufacturing method comprises:

obtaining a point light field distribution of each of the plurality of light-emitting units;

performing a superposition to point light field distributions of the plurality of light-emitting units in the light-emitting unit array according to an objective height of optical cavity and a preset pitch, to obtain a surface light field distribution of the light-emitting unit array, and calculating an optical flux ratio of a darkest point to a brightest point in the surface light field distribution; and in a case where the optical flux ratio is less than an objective ratio, adjusting the preset pitch and performing a superposition to the point-light field distributions of the plurality of light-emitting units in an adjusted light-emitting unit array according to the objective height of optical cavity and the adjusted preset pitch, to obtain an adjusted surface light field distribution of the adjusted light-emitting unit array, and calculating an optical flux ratio of a darkest point to a brightest point in the adjusted surface-light field distribution; in a case where the optical flux ratio is greater than or equal to the objective ratio, determining the preset pitch as an objective pitch.

17. The manufacturing method according to claim 16, wherein the preset pitch comprises six initial pitch values corresponding to the first pitch to the sixth pitch, respectively; and the adjusting the preset pitch comprises adjusting at least one of the six initial pitch values.

18. The manufacturing method according to claim 16, wherein the objective ratio is in a range of 0.85-0.95.

19. The manufacturing method according to claim 16, further comprising:

arranging the plurality of light-emitting units according to the objective pitch.

* * * * *